United States Patent [19]

Kraus et al.

[11] 3,857,930

[45] Dec. 31, 1974

[54] PREPARATION OF $AlH_3$ VIA $NaAlH_4$-$AlCl_3$ IN ETHER-TOLUENE

[75] Inventors: Theodore C. Kraus, Cheshire; Michael Scardera, Hamden, both of Conn.

[73] Assignee: The United States of America as represented by the Secretary of the Army, Washington, D.C.

[22] Filed: Dec. 24, 1968

[21] Appl. No.: 786,780

[52] U.S. Cl. .................................. 423/645, 149/87
[51] Int. Cl. ............................................. C01b 6/00
[58] Field of Search ............... 149/87; 23/204, 365; 423/645

[56] References Cited
UNITED STATES PATENTS

| | | | |
|---|---|---|---|
| 2,900,224 | 8/1959 | Hinckley et al. | 149/87 UX |
| 2,920,935 | 1/1960 | Finholt | 149/87 UX |
| 3,180,700 | 4/1965 | Robinson | 23/365 |
| 3,453,089 | 7/1969 | Giudice | 23/365 |
| 3,758,677 | 9/1973 | Kraus et al. | 423/645 |
| 3,803,082 | 4/1974 | Roberts et al. | 423/645 X |

*Primary Examiner*—Benjamin R. Padgett
*Assistant Examiner*—E. A. Miller
*Attorney, Agent, or Firm*—Edward J. Kelly; Herbert Berl; Jack W. Voight

[57] ABSTRACT

Macrocrystalline unsolvated aluminum hydride can be obtained via a $NaAlH_4$—$AlCl_3$ route by a process which involves synthesis and further treatment in a 1:1 ether-toluene medium. This process is considerably more economical and yields a superior product compared with the conventional $LiAlH_4$—$AlCl_3$ route. The aluminum hydride product is useful as a propellant ingredient.

9 Claims, No Drawings

PREPARATION OF AlH$_3$ VIA NaAlH$_3$-AlCl$_3$ IN ETHER-TOLUENE

BACKGROUND OF THE INVENTION

This invention relates to a novel process for the preparation of macrocrystalline unsolvated aluminum hydride.

A existing process for the production of macrocrystalline unsolvated aluminum hydride is illustrated by the equation:

$$3LiAlH_4 + AlCl_3 \rightarrow 4AlH_3 + 3LiCl$$

This process is known as the LiAlH$_4$—AlCl$_3$ route.

However, the LiAlH$_4$ which this process requires is quite expensive.

Accordingly, the preparing of aluminum hydride by a more economical route is a desirable route provided the product has suitable properties.

It is an object of this invention to provide an improved process for preparing aluminum hydride.

Another object of this invention is to provide a more economical process for preparing aluminum hydride.

Still another object of this invention is to provide a process for preparing aluminum hydride which yields a superior product for use as a propellant ingredient.

A particular object of this invention is to provide an improved process for preparing aluminum hydride which can employ some of the procedures developed for the LiAlH$_4$—AlCl$_3$ route.

Summary of the Invention: Aluminum hydride can be advantageously and economically prepared according to a process represented by the following equation:

$$3NaAlH_4 + AlCl_3 \rightarrow 4AlH_3 + 3NaCl$$

Both a LiAlH$_4$ initiator and a vigorous agitation in an ether medium are required.

Description of the Preferred Embodiments: Aluminum hydride can be prepared according to a process represented by the following equation:

$$3NaAlH_4 + AlCl_3 \rightarrow 4AlH_3 + 3NaCl$$

The use of both a LiAlH$_4$ initiator, an ether medium, and vigorous agitation (such as that achieved with a high speed stirrer) are required. A particularly satisfactory high speed stirrer is a "Labline" high speed stirrer. A particularly satisfactory ether is diethyl ether.

The course of the reaction is proposed as follows:

$$AlCl_3 + 3LiAlH_4 \rightarrow 3LiCl + 4AlH_3 \quad (1)$$

$$3LiCl + 3NaAlH_4 \rightarrow 3LiAlH_4 + 3NaCl \quad (2)$$

$$AlCl_3 + 3NaAlH_4 \rightarrow 4AlH_3 + 3NaCl \quad (3)$$

The insolubility of NaAlH$_4$ in diethyl ether is a drawback and necessitates the use of an initiator(s) and high speed agitation for the system.

The small amount of LiAlH$_4$ initiator reacts immediately; however, a regeneration of the LiAlH$_4$ apparently takes place as proposed by the reaction (2) noted above. This reaction has been demonstrated by an independent reaction experiment.

Several problems were noticed; namely 1) the very slow addition of AlCl$_3$ solution required to sustain the reaction, 2) the extremely high speed shearing agitation required, 3) the need for LiAlH$_4$ as an initiator, and 4) the occasional premature precipitation of the aluminum hydride before removal of the sodium chloride, which prevents consistently high yields.

The difficulty in promoting heterogeneous reactions in which at least one reactant is insoluble prompted the search for more suitable solvents. Although ethylene glycol dimethyl ether proved to be good solvent for sodium aluminum hydride, it was found that violent decomposition accompanied its removal from the complexed aluminum hydride.

A suitable solvent mixture which can be effectively separated without violent decomposition is a toluene-ether media rather than a single medium of ether. The disclosed reaction media permits the use of a higher reaction temperature, 45°–50°C., which, apparently is responsible for the increased rate of reaction. The reaction proceeds at an increased rate although no LiAlH$_4$ (as initiator) is required in the reaction phase. The AlCl$_3$ solution is added (and consumed) and 30 minutes instead of a few hours, and no appreciable precipitation occurs in the short time before removal of the sodium chloride, as is evidenced by the almost quantitative sodium chloride contents of the insoluble residues.

Aromatic solvents, such as benzene, toluene or xylene, in contrast to aliphatics, are found to be effective for retaining aluminum hydride in ethereal solution prior to crystallization, thus promoting the growth of crystalline aluminum hydride to yield macrocrystalline aluminum hydride.

Macrocrystalline unsolvated aluminum hydride has larger crystals (as the name implies) than the microcrystalline unsolvated aluminum hydride. Also, the density of the macrocrystalline unsolvated aluminum hydride has an average density of 1.53 g/cc as compared with an average density of 0.60 – 0.70 g/cc for the microcrystalline unsolvated aluminum hydride. Impact sensitivity measurements indicate that the macrocrystalline product is less sensitive than the microcrystalline product. This property is a desirable property for propellant application. Also, the higher density compound offers additional advantages by providing higher concentrations of fuel per unit volume. increased fuel loadings can be made and higher specific impulses per missile can be achieved as a result thereof.

The preparation of crystalline aluminum hydride involves 4 basic steps; namely, reaction, desolvation, conversion and crystallization.

The desolvation, conversion and crystallization steps of the process of this invention are accomplished according to the procedures developed for the LiAlH$_4$—AlCl$_3$ route. The reaction, step, however, is different.

A problem encountered in the conventional LiAlH$_4$—AlCl$_3$ process, e.g., polymerization of the [AlH$_4$]$^-$ radical, is circumvented by the process of this invention. Because of the insolubility of NaAlH$_4$ in ether, no prior polymerization of the [AlH$_4$]$^-$ is possible in the NaAlH$_4$—AlCl$_3$ route of this invention. Furthermore, the AlH$_3$ is synthesized in the presence of a large excess of AlCl$_3$. Thus, the AlCl$_3$ addition to the toluene-ether reaction media can be accomplished at a faster rate whereby the reaction time is shortened as compared with the LiAlH$_4$—AlCl$_3$ process.

As a result of using various ratios of ether to aromatic hydrocarbon two methods have been developed for the production of aluminum hydride through the process of this invention. These are the vacuum-atmospheric and atmospheric methods.

An example of a satisfactory set of conditions for the vacuumatmospheric method used in the process of this invention follows:

Vacuum-Atmospheric Process For Aluminum Hydride Preparation

Reagents

1. $NaAlH_4$, 26.5 g.(90%), (e.g., Ethyl Corporation Sample No. SAH-5)
2. $AlCl_3$, 18.0 g., (e.g., Baker and Adamson, Reagent ACS Code 1230)
3. Diethyl ether, 700ml., (e.g., Mallinckrodt Chemical, No. 0848)
4. Toluene, 700 ml., (e.g., Baker and Adamson, Reagent ACS Code 2398)
5. $LiAlH_4$, 3.5 g. (95%), (e.g., Metal Hydrides, Lot No. MF-619)
6. $LiBH_4$ solution, laboratory preparation, 2.16 g. $LiBH_4$ per 100 g. ether/toluene Apparatus System A This consists of a 2-1., 3-flask equipped with a water-cooled reflux condenser, thermomether, "Labline" high-speed stirrer, and a 125-ml. addition funnel. The exit of the condenser is connected to a mercury-sealed vent.

System B

This consists of a 3-1., 3-mecked, round-bottom flask fitted with a thermometers, "Lew" magnetic stirrer, distillation head, water-cooled condenser (downward), and receiver. The system is connected to a vacuum source, nitrogen source, and mercury-sealed vent.

Procedure

After System A is dried and purged with nitrogen, 0.44 mole sodium aluminum hydride, 600 ml. diethyl ether and 700 ml. toluene are added to the flask. This mixture is stirred (2000–2500 r.p.m.) and heated until the reaction medium attains a temperature of 48°C. At this point 0.135 mole aluminum chloride dissolved in approximately 100 ml. diethyl ether is dropped into the reaction mixture at a rate of 4.5 ml. per minute. Upon completion of the aluminum chloride addition, the reaction mixture is stirred an additional 12 minutes. The insoluble solids are allowed to settle, and a chloride titration is performed on a 10-ml. aliquot to determine the extent of the reaction.

Three and one-half grams lithium aluminum hydride and 100 g. of a 50–50 ether-toluene solution containing 2.16 g. lithium borohydride are added to the reaction mixture and the mixture is stirred for 15 minutes to dissolve the additives. The mixture is then filtered through a sintered-glass funnel into a 3-1., 3-necked flask of System B. The 3-1. flask of System B containing the clear filtrate is placed in an oil bath which has been preheated to 45°–50°C. and the distillation is conducted under the conditions set forth below. The pressures and temperature used in the vacuum stage of the distillation will vary with the ratio of toluene: ether used.

| Time (min.) | Temperatures Bath (°C.) | Pot (°C.) | Head (°C.) | Pressure (mm. of Hg) |
|---|---|---|---|---|
| 0 | 47 | — | — | 335[1] |
| 15 | 55 | 35 | 32 | 300 |
| 23 | 56 | 39.5 | 34 | 310 |
| 28 | 57 | 42 | 35 | 315 |
| 40 | 58 | 46.5 | 39 | 325 |
| 50 | 58 | 49 | 42 | 320[2] |
| 65 | 59 | 49 | 43 | 220 |
| 83 | 59 | 48 | 45 | 130[3] |
| 96 | 71 | 64.5 | 29 | atm |
| 114 | 93 | 87 | 30 | atm[4] |
| 133 | 99 | 95 | 42 | atm |
| 150 | 101 | 97 | 47 | atm |
| 165 | 101 | 97.5 | 35 | atm |
| 180 | 103 | 98 | 51 | atm |
| 190 | 104 | 99 | 54 | atm |

1. Agitation at the rate of 80 r.p.m. is initiated. The vacuum is pulled continuously until it reaches 335 mm., then the system is closed. The receiver is cooled with "dry-ice-acetone" when pot is immersed in oil bath.
2. Vacuum is applied briefly and the system is closed.
3. The system is brought to atmospheric pressure with nitrogen. The liquid medium is sampled and analyzed by vapor-pressure measurement for ether content. (If ether content is 2–5 per cent one proceeds to the next heating cycle which effects desolvation, crystallization and conversion.)
4. Four ml. of Hg are introduced into pot.

Following the heating cycle, the contents of the distillation pot are allowed to cool to room temperature, and the mother liquor and mercury are decanted. The residual solids are slurried out with several portions of ether and finally stirred with a total of 250 ml. of ether for 30 minutes. The ether extracts containing primarily $LiAlH_4$ and $LiBH_4$ are then decanted and the product washed with several additional 50-ml. portions of ether, each portion being decanted along with some fine-particle by-product. Finally, the product is removed by filtration, placed in a 300-ml. roundbottomed flask and dried under vacuum.

Yield

The yield in this example is 13.4 g. of white macro-crystalline aluminum hydride, 87 per cent of theoretical, based on aluminum chloride.
Anal.
Calculated: Al 89.92, H 10.08
Found: Al 86.85, H 9.9, C 0.4

An example of a satisfactory set of conditions for the atmospheric method used in the process of this invention follows.

Atmospheric Process For Aluminum Hydride Preparation

The aluminum hydride solution in toluene-ether is prepared by the standard procedure from 0.135 mole $AlCl_3$ and 0.44 mole $NaAlH_4$. Approximately 0.088 mole $LiAlH_4$ (solid) and 0.1 mole $LiBh_4$ in 125 ml. ether-toluene (1:1 v/v) are added. The reaction mixture is then diluted with 1525 ml. toluene and filtered into a 5-liter, three-necked flask. The clear filtrate had the following approximate composition:
0.405 mole $AlH_3$
0.088 mole $LiAlH_4$ 0.10 mole LiBh$_4$
765 ml. Ether
2290 ml. Toluene The 5-liter flask is fitted with a thermometer, "Lew" magnetic stirrer, and distillation head with a water-cooled condenser and dry icecooled receiver. A dry nitrogen source is provided, and the apparatus is sealed from the atmosphere by a mercury bubble-off.

The reaction flask is placed in an oil bath which is heated from room temperature (24°C.) to 110°C. in 85 minutes. The reaction mixture rose from 27° to 91°C. during this time; boiling began at 67°–68°C. The bath temperature is then maintained at 109°–111°C. for 26 minutes. The reaction mixture rose from 91° to 100°C. and was above 95°C. for 20 minutes. The system is maintained at atmospheric pressure during the entire experiment. Distillation is continued throughout the heating period above 67°C. with approximately 700 ml. of distillate being collected.

The reaction mixture is removed from the bath, and allowed to cool slowly with stirring. The product is then isolated by the standard decantation and washing procedure. After drying about 17 hours under vacuum, 10.0 g. (0.33 mole, 65% yield) of macrocrystalline aluminum hydride is obtained.

Analysis

Calculated: M, 89.9; H, 10.1; C,0.0
Found: M, 87.19; H, 10.0, 10.1; C, 0.2, 0.3 (M = aluminum)

Not only is an outstanding improvement in economy gained by the use of NaAlH$_4$ rather than LiAlH$_4$, but an aluminum hydride product of improved properties is obtained thereby. The aluminum hydride product, without the benefit of any subsequent treatment, exhibits unusually high thermal stabilities and is of a preferred crystalline form. The product has been shown to be aluminum hydride(58) is macrocrystalline unsolvated form. (The various forms of unsolvated aluminum hydride are named according to the maximum absorption in the infrared; e.g., aluminum hydride(58) absorbs strongest at 5.8 microns.) It has been definitely established that this is the preferred form of final unsolvated aluminum hydride desired for propellant applications.

The improvement of the thermal stability of the aluminum hydride product through the use of the process of this invention allows the use of aluminum hydride over extended periods of time in solid propellant formulations. Also, a particularly useful form of aluminum hydride is obtained by the process of this invention. The improved properties of the product obtained by the process of this invention together with the outstanding economy of this process are a significant development in the chemistry of solid propellant ingredients.

The aluminum hydride is used as the fuel component in a propellant composition. Various oxidizers may be used therewith. A typical oxidizer is an inorganic oxidizing salt such as ammonium perchlorate or ammonium nitrate. The preferred oxidizer, however, is hydrazinium nitrate. Similarly. various binders may be used therewith. The preferred binder is polyethylene.

We claim:

1. A process for synthesizing macrocrystalline unsolvated aluminum hydride having a maximum absorption in the infrared at 5.8 microns, said process comprising the steps of:
   a. reacting sodium aluminum hydride with aluminum chloride in a diethyl ether -aromatic solvent reaction medium to form aluminum hydride and an alkali metal halide in said reaction medium said aromatic solvent selected from benzene, toluene, and xylene;
   b. removing said alkali metal by means of filtration to prevent the premature precipitation of said aluminum hydride formed;
   c. heating said aluminum hydride in said reaction medium;
   d. distilling said reaction medium until the diethyl ether is substantially removed by means of a distillation process performed at predetermined temperatures and pressures;
   e. continuing said heating and said distilling to effect desolvation and crystallization to yield macrocrystalline unsolvated aluminum hydride;
   f. separating said aromatic solvent from said macrocrystalline unsolvated aluminum hydride; and,
   g. drying said macrocrystalline unsolvated aluminum hydride, said macrocrystalline unsolvated aluminum hydride being characterized by having a maximum absorption in the infrared at 5.8 microns.

2. The process of claim 1 and wherein said aromatic solvent is toluene.

3. The process of claim 2 and wherein said distillation process is performed under vacuum.

4. The process of claim 3 and wherein said distillation process is performed at about 45°C. to about 50°C. and at about 335 millimeters of mercury absolute pressure, followed by heating at about atmospheric pressure at about 100°C., the ratio of said toluene to said ether being about 1 to 1.

5. The process of claim 4 and wherein LiBH$_4$ is incorporated in said diethyl ether-aromatic solvent reaction medium prior to said reacting.

6. The process of claim 5 and wherein LiAlH$_4$ is incorporated in said diethyl ether-aromatic solvent reaction medium prior to said reacting.

7. The process of claim 6 and wherein said aluminum chloride is slowly added to said sodium aluminum hydride and wherein said distillation is continued until said ether is stripped to at least about 2 to about 5 weight percent ether.

8. The process of claim 2 and wherein said distillation is performed at about atmospheric pressure.

9. The process of claim 8 and wherein said distillation process is performed at about 90°C., the volume ratio of said toluene to said ether being about one to one, and wherein said ether is stripped to at least about 2 to about 5 weight percent ether, and wherein LiBH$_4$ and LiAlH$_4$ are incorporated in said diethyl ether-aromatic solvent reaction medium prior to said reacting.

* * * * *